//

US010995913B2

(12) United States Patent
Fujita (10) Patent No.: US 10,995,913 B2
(45) Date of Patent: May 4, 2021

(54) VEHICLE AND METHOD FOR FILLING FUEL GAS

(71) Applicant: TOYOTA JIDOSHA KABUSHIKI KAISHA, Toyota (JP)

(72) Inventor: Keisuke Fujita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 15/919,992

(22) Filed: Mar. 13, 2018

(65) Prior Publication Data
US 2018/0266633 A1 Sep. 20, 2018

(30) Foreign Application Priority Data

Mar. 15, 2017 (JP) .............................. JP2017-050502

(51) Int. Cl.
*F17C 13/10* (2006.01)
*F17C 5/06* (2006.01)
(Continued)

(52) U.S. Cl.
CPC .............. *F17C 13/10* (2013.01); *F17C 5/007* (2013.01); *F17C 5/04* (2013.01); *F17C 5/06* (2013.01); *F17C 13/025* (2013.01); *F17C 13/026* (2013.01); *H01M 8/04201* (2013.01); *F17C 2205/0376* (2013.01); *F17C 2221/012* (2013.01); *F17C 2221/033* (2013.01); *F17C 2221/035* (2013.01);
(Continued)

(58) Field of Classification Search
CPC .... F17C 13/10; F17C 5/007; F17C 2265/065; F17C 2270/0178; F17C 2270/0184; F17C 2221/012; Y02E 60/50; Y02E 60/32

USPC .......................................................... 141/94
See application file for complete search history.

(56) References Cited

U.S. PATENT DOCUMENTS 5,301,723 A * 4/1994 Goode ...................... F17C 5/02
141/11
5,406,988 A * 4/1995 Hopkins .................. F17C 7/00
123/527

(Continued)

FOREIGN PATENT DOCUMENTS

JP H09079495 A 3/1997
JP 2006209994 A 8/2006
(Continued)

*Primary Examiner* — Timothy L Maust
*Assistant Examiner* — James R Hakomaki
(74) *Attorney, Agent, or Firm* — Hunton Andrews Kurth LLP (57) ABSTRACT

A vehicle including: a tank configured to be filled with fuel gas; a receptacle configured to be connected to a nozzle included in a fuel gas filling apparatus; a filling passage configured to provide communication between the receptacle and the tank; a heating unit configured to heat the receptacle; a determination unit configured to determine whether or not a parameter value, correlated with a filling speed of the fuel gas filled into the tank from the fuel gas filling apparatus, indicates decrease in the filling speed during filling of the fuel gas into the tank; and a control unit configured to, when the determination unit determines that the parameter value indicates decrease in the filling speed during filling of the fuel gas into the tank, to cause the heating unit to start heating of the receptacle during filling of the fuel gas into the tank.

5 Claims, 9 Drawing Sheets

(51) Int. Cl.
*F17C 5/04* (2006.01)
*F17C 13/02* (2006.01)
*H01M 8/04082* (2016.01)
*F17C 5/00* (2006.01)

(52) U.S. Cl.
CPC .............. *F17C 2223/0123* (2013.01); *F17C 2223/036* (2013.01); *F17C 2227/0304* (2013.01); *F17C 2227/039* (2013.01); *F17C 2227/0337* (2013.01); *F17C 2227/0388* (2013.01); *F17C 2250/032* (2013.01); *F17C 2250/034* (2013.01); *F17C 2250/043* (2013.01); *F17C 2250/0439* (2013.01); *F17C 2250/0443* (2013.01); *F17C 2250/0636* (2013.01); *F17C 2250/075* (2013.01); *F17C 2260/02* (2013.01); *F17C 2260/032* (2013.01); *F17C 2265/065* (2013.01); *F17C 2270/0139* (2013.01); *F17C 2270/0168* (2013.01); *F17C 2270/0178* (2013.01); *F17C 2270/0184* (2013.01); *H01M 2250/20* (2013.01); *Y02T 90/40* (2013.01)

(56) References Cited

U.S. PATENT DOCUMENTS

| | | | | |
|---|---|---|---|---|
| 5,479,966 | A * | 1/1996 | Tison | F17C 5/06 141/12 |
| 5,488,978 | A * | 2/1996 | Kountz | F17C 5/007 141/18 |
| 6,643,951 | B1 * | 11/2003 | Chowdhury | F17C 7/02 34/402 |
| 2005/0178463 | A1 * | 8/2005 | Kountz | F17C 9/02 141/4 |
| 2009/0126372 | A1 * | 5/2009 | Faka | F17C 7/04 62/50.2 |
| 2010/0307636 | A1 * | 12/2010 | Uemura | F17C 5/06 141/4 |
| 2012/0125480 | A1 * | 5/2012 | Inagi | F17C 5/06 141/4 |
| 2012/0125482 | A1 * | 5/2012 | Mori | F17C 5/007 141/98 |
| 2012/0227864 | A1 * | 9/2012 | Mori | F17C 5/06 141/95 |
| 2012/0291902 | A1 * | 11/2012 | Mori | B60K 15/04 138/40 |
| 2013/0014854 | A1 * | 1/2013 | Mori | F17C 5/007 141/1 |
| 2013/0037165 | A1 * | 2/2013 | Okawachi | F17C 5/06 141/4 |
| 2013/0061983 | A1 | 3/2013 | Komiya et al. | |
| 2014/0174593 | A1 * | 6/2014 | Ammouri | F17C 5/007 141/4 |
| 2014/0332114 | A1 * | 11/2014 | Nagura | F17C 13/025 141/4 |
| 2016/0146401 | A1 * | 5/2016 | Leachman | F17C 5/06 141/4 |
| 2017/0023180 | A1 * | 1/2017 | Petit | F17C 5/06 |
| 2017/0038238 | A1 * | 2/2017 | Nguyen | G01F 22/00 |
| 2017/0355260 | A1 * | 12/2017 | Dudar | B29C 71/00 |
| 2017/0356408 | A1 * | 12/2017 | Yang | F02M 37/0076 |

FOREIGN PATENT DOCUMENTS

| | | |
|---|---|---|
| JP | 2011002052 A | 1/2011 |
| JP | 2011047491 A | 3/2011 |
| JP | 2011179519 A | 9/2011 |
| JP | 2011185357 A | 9/2011 |
| JP | 2014119103 A | 6/2014 |
| WO | 2011110911 A1 | 9/2011 |
| WO | 2013038445 A1 | 3/2013 |

* cited by examiner

VEHICLE AND METHOD FOR FILLING FUEL GAS

INCORPORATION BY REFERENCE

The disclosure of Japanese Patent Application No. 2017-050502 filed on Mar. 15, 2017 including the specification, drawings and abstract is incorporated herein by reference in its entirety.

BACKGROUND

1. Technical Field

The present disclosure relates to a vehicle and a method for filling fuel gas.

2. Description of Related Art

When a tank of a vehicle is filled with fuel gas from a fuel gas filling apparatus, a nozzle of the fuel gas filling apparatus is connected to a receptacle on the vehicle side. In order to suppress difficulty of disconnecting the nozzle and the receptacle caused by freezing, Japanese Patent Application Publication No. 2011-047491 discloses a technique of heating the receptacle when the temperature of the receptacle during filling of the fuel gas is equal to or below a specified temperature.

SUMMARY

When heating of the receptacle is started with reference to only the temperature of the receptacle as in JP 2011-047491 A, the following difficulties may occur depending on heating start time. When the heating start time is too soon with respect to filling end time at which the amount of fuel gas filled into the tank reaches a target filling amount, the fuel gas, while passing through the receptacle, may be heated and volumetrically expanded. As a result, an actual filling amount may decrease. Power consumption relating to the heating may also increase. Contrary to this, when the heating start time is too late with respect to the filling end time, that is, the heating is started immediately before the filling end time, the nozzle and the receptacle may not thaw and be left frozen immediately after the filling end time.

Accordingly, the present disclosure provides a vehicle and a method for filling fuel gas that suppress decrease in the amount of fuel gas filled in a tank, suppress increase in power consumption, and also suppress freezing of a nozzle of a fuel gas filling apparatus and a receptacle of the vehicle.

The present disclosure relates to a vehicle including a tank configured to be filled with fuel gas; a receptacle configured to be connected to a nozzle included in a fuel gas filling apparatus; a filling passage configured to provide communication between the receptacle and the tank; a heating unit configured to heat the receptacle; a determination unit; and a control unit. The fuel gas filling apparatus is configured to cool the fuel gas, fill the fuel gas into the tank, decrease a filling speed of the fuel gas filled into the tank before a filling amount of the fuel gas filled into the tank reaches a target filling amount, and then end filling of the fuel gas into the tank. The determination unit is configured to determine whether or not a parameter value, correlated with the filling speed of the fuel gas filled into the tank from the fuel gas filling apparatus, indicates decrease in the filling speed during filling of the fuel gas into the tank. The control unit is configured to, when the determination unit determines that the parameter value indicates decrease in the filling speed during filling of the fuel gas into the tank, cause the heating unit to start heating of the receptacle during filling of the fuel gas into the tank.

The fuel gas filling apparatus decreases the filling speed of the fuel gas filling into the tank before ending the filling. This makes it possible to determine that the filling soon ends, when the parameter value correlated with the filling speed decreases during filling of the fuel gas. Thus, it is determined that the filling ends soon, and then heating of the receptacle is started during filling of the fuel gas. This makes it possible to suppress freezing of the nozzle and the receptacle, while suppressing decrease in the filling amount of the fuel gas and suppressing increase in power consumption.

The parameter value may be any one of a change rate of pressure inside the tank, a change rate of temperature inside the tank, and a flow rate of the fuel gas flowing into the tank.

The tank may have a resinous liner.

The vehicle may include an ambient temperature sensor that detects ambient temperature, and the control unit may be configured to, when the detected ambient temperature is equal to or below a specified temperature and when the determination unit determines that the parameter value indicates decrease in the filling speed during filling of the fuel gas into the tank, cause the heating unit to start heating of the receptacle during filling of the fuel gas into the tank.

The vehicle may also include a fuel cell configured to generate electric power upon reception of the fuel gas filled in the tank.

The present disclosure also relates to a method for filling fuel gas, including filling a tank with cooled fuel gas from a fuel gas filling apparatus through a connecting portion configured to detachably connect the tank and the fuel gas filling apparatus, decreasing a filling speed of filling the fuel gas into the tank before a filling amount of the fuel gas filled into the tank reaches a target filling amount, and then ending filling of the fuel gas into the tank. The method includes: determining whether or not a parameter value, correlated with the filling speed of the fuel gas filled into the tank from the fuel gas filling apparatus, indicates decrease in the filling speed during filling of the fuel gas into the tank; and starting heating of the connecting portion during filling of the fuel gas into the tank, when determining that the parameter value indicates decrease in the filling speed during filling of the fuel gas into the tank.

It becomes possible to provide a vehicle and a method for filling fuel gas that suppress decrease in the amount of fuel gas filled in a tank, suppress increase in power consumption, and also suppress freezing of a nozzle of a fuel gas filling apparatus and a receptacle of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENT

Figure 1:
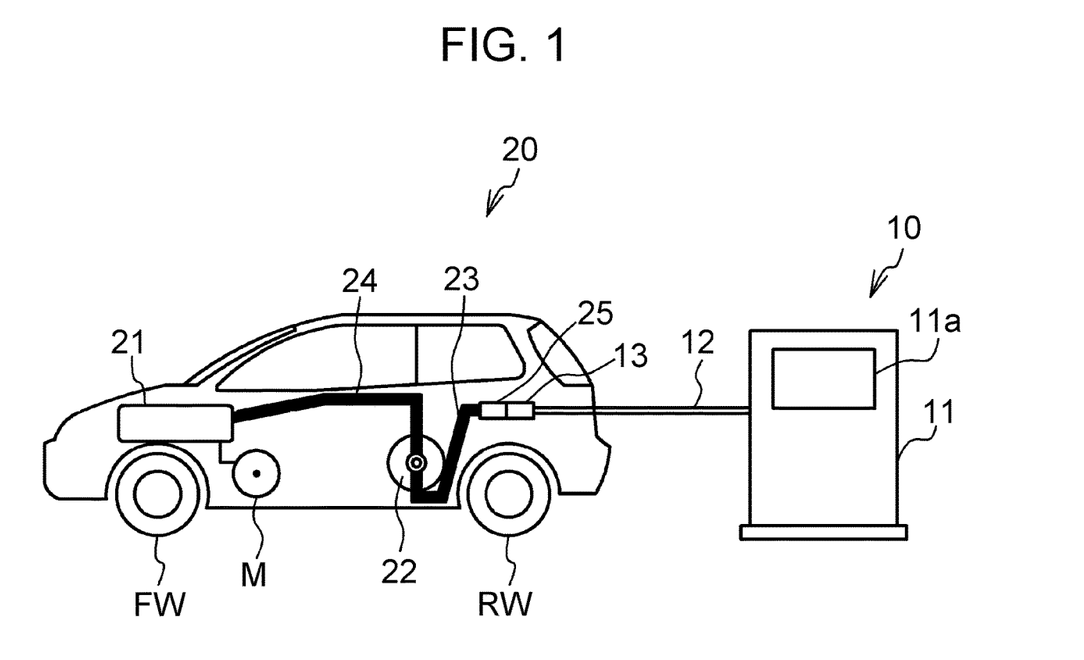
FIG. 1 is an explanatory view of a gas filling system.
Figure 2:
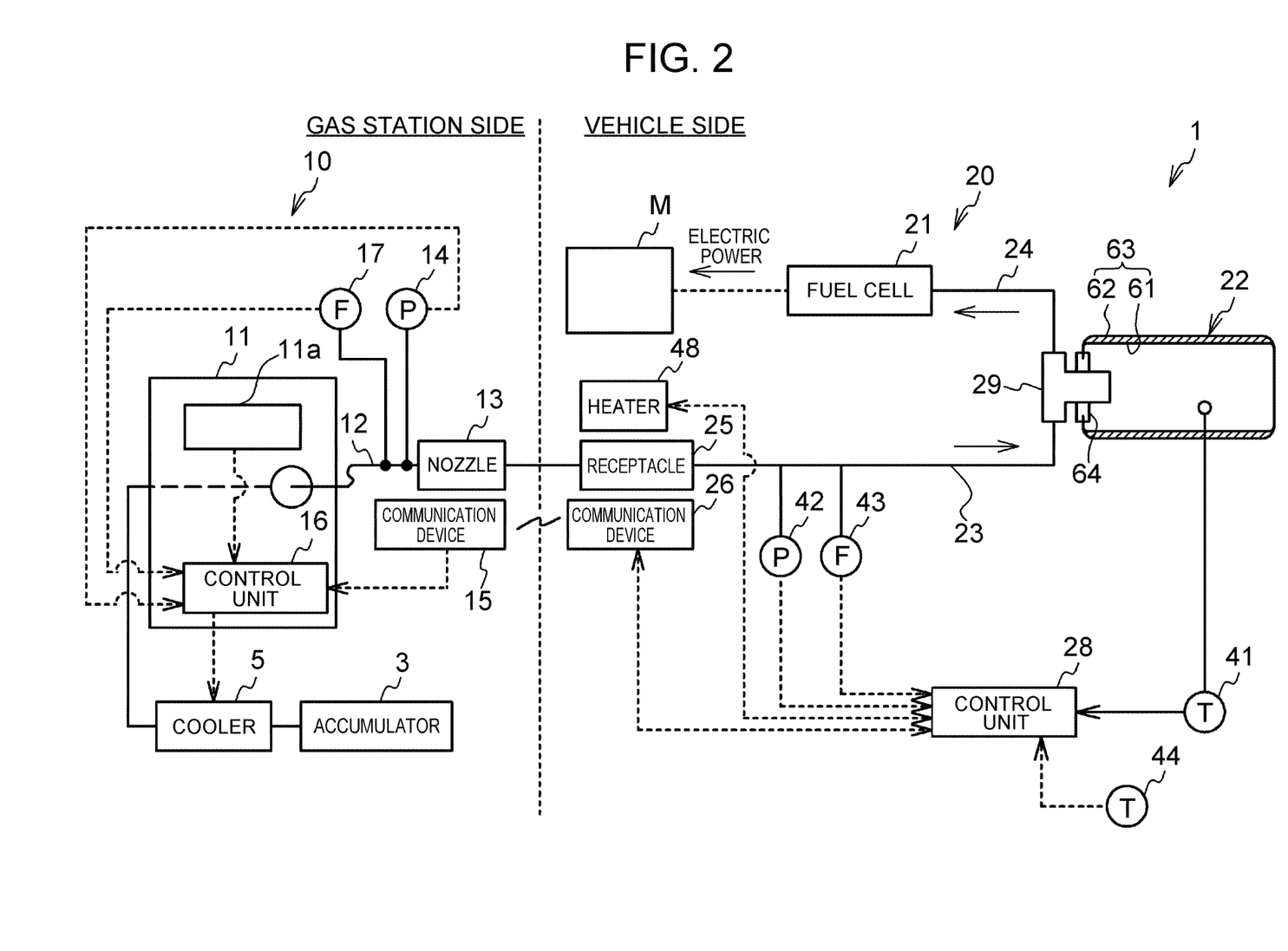
FIG. 2 is an explanatory view of a gas station and a vehicle.

FIG. 1 is an explanatory view of a gas filling system 1. The gas filling system 1 includes a vehicle 20 that travels with electric power generated by a fuel cell 21 with use of fuel gas, and a gas station 10 that fills a tank 22 of the vehicle 20 with the fuel gas. As the fuel gas, hydrogen gas is used. FIG. 2 is an explanatory view of the gas station 10 and the vehicle 20.

First, the gas station 10 will be described. The gas station 10 includes an accumulator 3, a cooler 5, a dispenser 11, a filling hose 12, a nozzle 13, a pressure sensor 14, a communication device 15, a control unit 16, and a flow sensor 17. The accumulator 3 accumulates hydrogen gas from a hydrogen curdle which is not illustrated. The pressure of the hydrogen gas is stepped up to a specified pressure by a compressor. The cooler 5 performs preliminary cooling of the hydrogen gas coming from the accumulator 3. The dispenser 11 sends out the hydrogen gas coming from the cooler 5 to the filling hose 12 connected to the dispenser 11. The dispenser 11 is provided with an operator panel 11a that accepts a desired target filling amount or a target filling pressure of the hydrogen gas filled into the tank 22 of the vehicle 20, the desired target filling amount and the target filling pressure being set by a user. The nozzle 13 is attached at the tip of the filling hose 12. The pressure sensor 14 and the flow sensor 17 are provided in the vicinity of the nozzle 13. The pressure sensor 14 and the flow sensor 17 detect the pressure and the flow rate of the hydrogen gas that passes through the nozzle 13, respectively. The pressure sensor 14 and the flow sensor 17 may detect the pressure and the flow rate in a route from the dispenser 11 to the nozzle 13, respectively, and may be provided inside the dispenser. The communication device 15 will be described later. The control unit 16 is a microcomputer including a central processing unit (CPU), a read only memory (ROM), a random access memory (RAM), and a memory. The control unit 16 is electrically connected to the cooler 5, the pressure sensor 14, the communication device 15, and the flow sensor 17 so as to control the operation of the entire gas station 10.

A description is now given of the vehicle 20. The vehicle 20 includes a fuel cell 21, a tank 22, a filling passage 23, a feed passage 24, a receptacle 25, a communication device 26, a control unit 28, a temperature sensor 41, a pressure sensor 42, a flow sensor 43, an ambient temperature sensor 44, a heater 48, a motor M, front wheels FW, and rear wheels RW. The fuel cell 21 generates electric power with oxidant gas supply and hydrogen gas supplied from the tank 22. The tank 22 can be filled with high-pressure hydrogen gas. The details of the tank 22 will be described later. The filling passage 23 guides the hydrogen gas supplied from the gas station 10 to the tank 22. The feed passage 24 supplies hydrogen gas from the tank 22 to the fuel cell 21. The receptacle 25 communicates with the top end of the filling passage 23. The receptacle 25 is a portion to be connected to the nozzle 13 when hydrogen gas is filled into the tank 22. For example, the receptacle 25 is provided in a lid box of the vehicle 20. The receptacle 25 and the nozzle 13 are examples of the connecting portion that detachably connects the tank 22 and the gas station 10. The communication device 26 and the control unit 28 will be described later. The motor M is a traveling motor of the vehicle 20 that drives with the electric power supplied from the fuel cell 21. The motive power of the motor M is transmitted to at least one of the front wheels FW and the rear wheels RW. The temperature sensor 41 detects gas temperature that is the temperature of hydrogen gas inside the tank 22. The pressure sensor 42 and the flow sensor 43 detect the pressure and the flow rate of the hydrogen gas that passes through the filling passage 23, respectively. During filling of the tank 22 with hydrogen gas, the filling passage 23 and the tank 22 communicate with each other, so that pressure values in the filling passage 23 and the tank 22 become substantially identical. In this state, the detection value of the pressure sensor 42 indicates the pressure value inside the tank 22. The ambient temperature sensor 44 detects ambient temperature around the vehicle 20. The heater 48, which will be described in detail later, is provided in the vicinity of the receptacle 25. The heater 48 is one example of a heating unit that heats the receptacle 25.

The tank 22 has a body portion 63, a mouth ring 64 attached to one end portion of the body portion 63 in the longitudinal direction of the body portion 63, and a valve 29 that opens and closes an opening portion of the mouth ring 64. The body portion 63 has a resinous liner 61, and a reinforced layer 62. The reinforced layer 62 includes a fiber reinforced layer formed by winding fiber containing thermosetting resin around the outer circumference of the liner 61. The tank 22 is filled with and releases hydrogen gas through the valve 29. The temperature inside the tank 22 is detected by the temperature sensor 41.

The control unit 28 is a microcomputer including a CPU, a ROM, a RAM, and a memory. The control unit 28 controls operation of the entire vehicle 20 based on each sensor signal to be input. The control unit 28 is electrically connected with the communication device 26, the temperature sensor 41, the pressure sensor 42, the flow sensor 43, and the ambient temperature sensor 44. The control unit 28, which will be described later in detail, executes heating control that heats the receptacle 25 during filling hydrogen gas into the tank 22. The heating control is implemented by a determination unit and a control unit functionally implemented by the CPU, the ROM, the RAM, and the memory of the control unit 28.

The control unit 16 of the gas station 10 and the control unit 28 of the vehicle 20 can receive specified information from the control unit 28 of the vehicle 20 through the communication devices 15, 26. The communication devices 15, 26 allow wireless communication, such as infrared ray communication, with each other. The control unit 16 acquires information, including the pressure and gas temperature inside the tank 22, from the control unit 28 of the vehicle 20 through the communication devices 15, 26. The control unit 16 may also acquire information, such as a filling capacity of the tank 22 and allowable pressure of the tank 22. The control unit 16 controls each device in the gas station 10 based on the information acquired from the vehicle 20 side and on the information such as a target filling amount of the hydrogen gas received with the operator panel 11a of the dispenser 11, so as to control the filling speed and the filling amount of hydrogen gas filled into the vehicle 20. The communication devices 15, 26 are provided in the vicinity of the nozzle 13 and the receptacle 25, respectively.

The communication devices 15, 26 are in a communication enabled state when the nozzle 13 and the receptacle 25 are connected.

Now, the gas station 10 will be described in detail. The gas station 10 is one example of a fuel gas filling apparatus that decreases the filling speed of hydrogen gas filled into the tank 22 before the filling amount of hydrogen gas filled into the tank 22 reaches a target filling amount, and then ends filling of hydrogen gas into the tank 22. Specifically, the control unit 16 of the gas station 10 performs control such that as an actual filling amount of the tank 22, from the start of filling, approaches the target filling amount, the filling speed of hydrogen gas, i.e., the flow rate of hydrogen gas from the dispenser 11 to the tank 22, gradually or continuously decreases. More specifically, the control unit 16 calculates the actual filling amount of the tank 22 from the start of filling based on a detection value of the flow sensor 17. When a difference between a calculated filling amount and a set target filling amount becomes equal to or below a specified value, the control unit 16 determines that the end of filling is approaching, and sets the flow rate of the hydrogen gas to be lower than before based on the determination. When a difference between a detection value of the pressure sensor 14 and a set target filling pressure becomes lower than a specified value as a result of comparison therebetween, the control unit 16 may determine that the end of filling is approaching, and may set the flow rate of the hydrogen gas to be lower than before based on the determination. The flow rate of hydrogen gas is regulated by regulating the opening degree of an unillustrated solenoid valve provided in a connection point between the dispenser 11 and the filling hose 12.

The function of the heater 48 will be described. During filling of hydrogen gas into the tank 22, the nozzle 13 and the receptacle 25 may freeze, which may make it difficult to disconnect the nozzle 13 and the receptacle 25 after filling is over. For example, when the tank 22 of the vehicle 20 is filled up with hydrogen gas, the cooler 5 cools the hydrogen gas to a specified low temperature, for example, to −20° C., as described above. This is because the nozzle 13 and the receptacle 25 may be cooled by the hydrogen gas that is cooled to below the freezing point. Such freezing may easily occur when the ambient temperature is low in particular. Accordingly, the heater 48 is provided to suppress freezing of the nozzle 13 and the receptacle 25 during filling of hydrogen gas.

A description is now given of the possibility at the time when the heater 48 starts to heat the receptacle 25. When heating starts too soon during filling of hydrogen gas, the hydrogen gas passing through the receptacle 25 during filling may also be heated and volumetrically expanded. As a result, the filling amount of hydrogen gas filled into the tank 22 may decrease. Power consumption relating to the heating may also increase. When heating starts too late, the receptacle 25 may be left frozen at the time immediately after the end of filling. As a result, it may be difficult to disconnect the nozzle 13 from the receptacle 25. Accordingly, the control unit 28 of the present embodiment executes heating control that starts heating of the receptacle 25 with the heater 48 at adequate timing.

Figure 3:
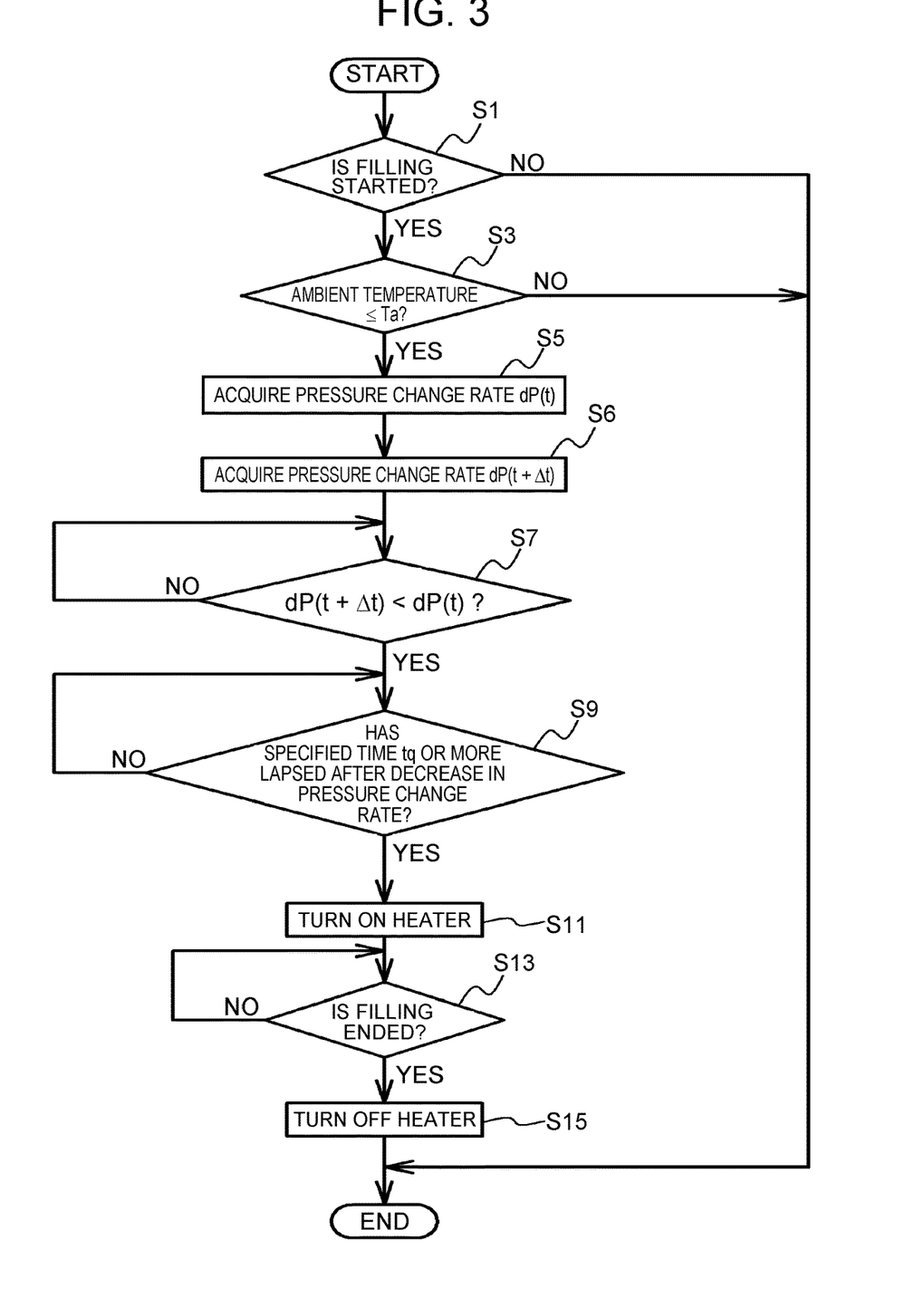
FIG. 3 is a flowchart illustrating one example of heating control in a present embodiment.

FIG. 3 is a flowchart illustrating one example of the heating control in the present embodiment. The heating control is repeatedly executed by the control unit 28 in every specified period. As illustrated in FIG. 3, the control unit 28 determines whether or not filling of hydrogen gas is started (step S1). Specifically, the control unit 28 determines that filling of hydrogen gas is started at such events where the communication devices 15, 26 are put in the communication enabled state, a fuel cover of a lid box opens, or increase in pressure value of the filling passage 23 indicated by the pressure sensor 42 is detected. When negative determination is made in step S1, the present control is ended.

When positive determination is made in step S1, the control unit 28 determines, based on the detection value from the ambient temperature sensor 44, whether or not ambient temperature is equal to or below a specified temperature Ta (step S3). The specified temperature Ta is a preset temperature at which the nozzle 13 and the receptacle 25 may freeze during filling of hydrogen gas into the tank 22 from the gas station 10. When negative determination is made in step S3, the control unit 28 determines that freezing of the nozzle 13 and the receptacle 25 does not occur, and ends the present control.

When positive determination is made in step S3, the control unit 28 acquires a pressure change rate dP(t) at time t based on the detection value of the pressure sensor 42 (step S5). The pressure change rate dP(t) first rises to a specified value at the start of filling, and then the value is maintained in the middle stage. Here, the pressure change rate is one example of a parameter value correlated with filling speed of hydrogen gas filled into the tank 22 from the gas station 10. The filling speed of hydrogen gas filled into the tank 22 from the gas station 10 is synonymous with the flow rate of hydrogen gas flowing from the gas station 10 to the tank 22. That is, the pressure change rates inside the tank 22 and the filling passage 23 change in accordance with change in the flow rate. The change rate of pressure is calculated by differentiating a pressure value calculated based on the detection value of the pressure sensor 42 by time.

Next, the control unit 28 acquires a pressure change rate dP(t+$\Delta$t) after the lapse of $\Delta$t from time t (step S6). The control unit 28 compares the pressure change rate dP(t+$\Delta$t) with the pressure change rate dP(t) at time t to determine whether or not dP(t+$\Delta$t) becomes smaller than dP(t) (step S7). Therefore, the control unit 28 of the vehicle 20 can determine that the filling amount of hydrogen gas filled into the tank 22 is approaching the target filling amount, i.e., the end of filling is approaching, when the pressure change rates inside the filling passage 23 and the tank 22, calculated based on the detection value of the pressure sensor 42, decrease. Processing of step S7 is one example of processing executed by the determination unit that determines whether or not the pressure change rate, correlated with the filling speed of hydrogen gas filled into the tank 22 from the gas station 10, indicates decrease in filling speed during filling of hydrogen gas into the tank 22. Processing of step S7 is one example of a determination step that determines whether or not the rate of pressure change, correlated with the filling speed of hydrogen gas filled into the tank 22 from the gas station 10, indicates decrease in the filling speed during filling of hydrogen gas into the tank 22. When negative determination is made in step S7, processing of step S7 is executed again.

When positive determination is made in step S7, the control unit 28 determines whether or not specified time tq or more has lapsed after decrease in the pressure change rate (step S9). The specified time tq is preset to be the time from decrease in the pressure change rate until before the end of filling. When negative determination is made in step S9, processing of step S9 is executed again.

When positive determination is made in step S9, the control unit 28 determines that the filling ends soon. Based on the determination, the control unit 28 turns on the heater 48, and starts to heat the receptacle 25 (step S11). Accordingly, freezing of the nozzle 13 and the receptacle 25 is suppressed. Processing of step S11 is one example of processing executed by the control unit that causes the heater 48 to start heating of the receptacle 25 during filling of hydrogen gas into the tank 22, when positive determination is made in steps S7 and S9. Processing of step S11 is one example of a heating start step that starts heating of the receptacle 25 during filling of the fuel gas into the tank 22, when positive determination is made in steps S7 and S9.

Next, the control unit 28 determines whether or not the filling of hydrogen gas is ended (step S13). Specifically, the control unit 28 makes the determination based on whether or not the detection value of the pressure sensor 42 becomes a fixed value. The control unit 16 determines, based on a detection value of the flow sensor 17, whether or not the actual filling amount of hydrogen gas filled into the tank 22 from the start of filling reaches the target filling amount. When the actual filling amount reaches the target filling amount, the control unit 16 closes the solenoid valve provided in the connection point between the dispenser 11 and the filling hose 12. The control unit 16 may determine, based on the detection value of the pressure sensor 14, whether or not the actual filling amount reaches the target filling amount. When negative determination is made in step S13, processing of step S13 is executed again. When positive determination is made, the heater 48 is switched from ON to OFF (step S15), and heating of the receptacle 25 stops.

Figure 4:
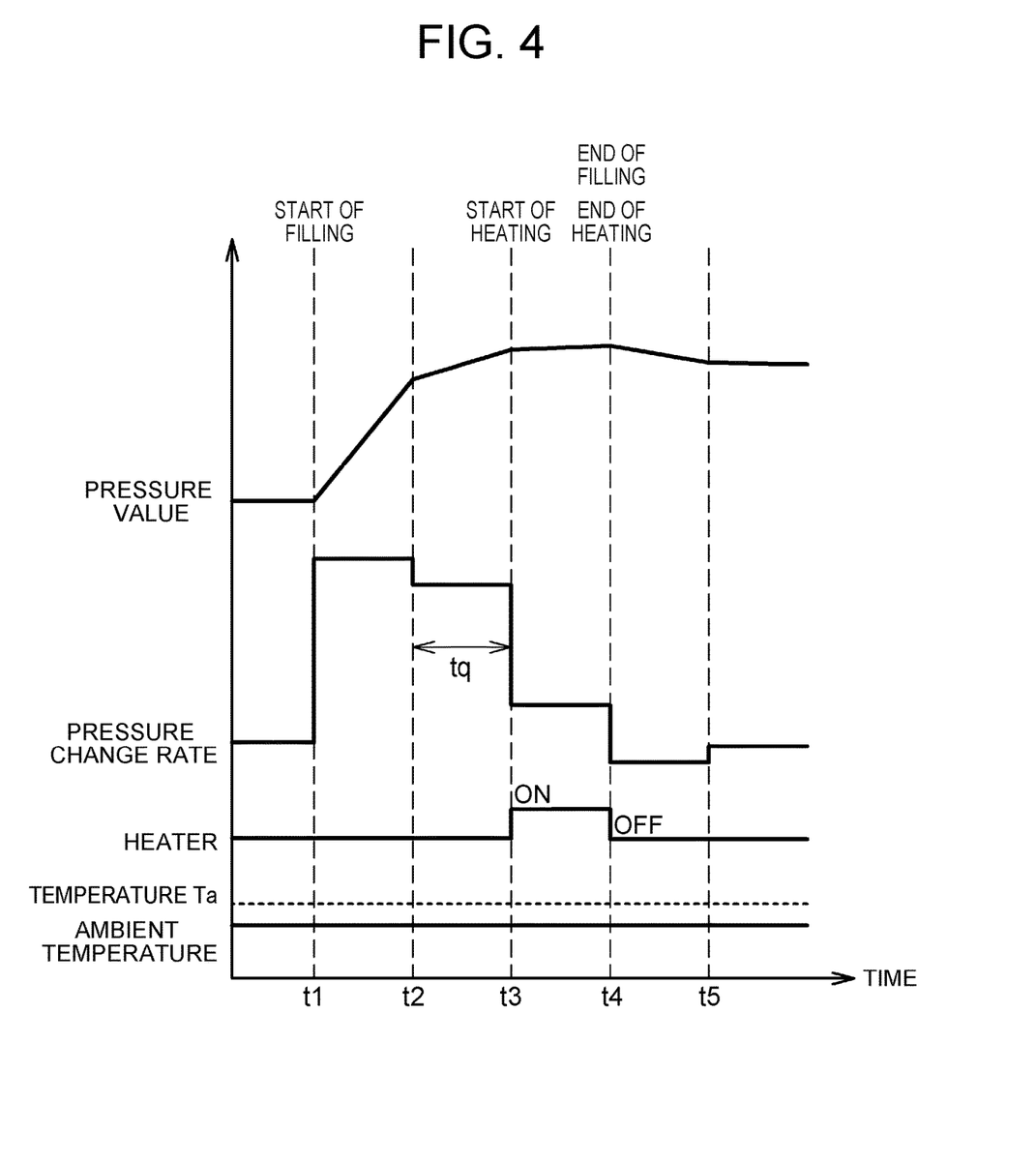
FIG. 4 is a timing chart illustrating one example of the heating control in the present embodiment.

FIG. 4 is a timing chart illustrating one example of the heating control of the present embodiment. FIG. 4 illustrates a pressure value calculated based on the detection value of the pressure sensor 42, a pressure change rate calculated based on the pressure value, an energized state of the heater 48, and ambient temperature. When filling is started at time t1, the pressure value rises with a steep gradient, while the pressure change rate is maintained at a relatively high value. At time t2, the control unit 16 of the gas station 10 determines that the end of filling is approaching. Based on the determination, the control unit 16 sets the flow rate of fuel gas filled into the tank 22 from the gas station 10 to be lower than before. Accordingly, at time t2, the pressure value has a gradual climb gradient, so that the pressure change rate decreases. Thus, during a period from time t2 at which the pressure change rate decreases from a relatively high value to time t3 at which the specified period tq has lapsed, the heater 48 is switched from OFF to ON, and heating of the receptacle 25 is started. When filling is completed at time t4, the heater 48 is switched to OFF.

The reason why the pressure value has a still more gradual climb gradient at time t3 than before is because the control unit 16 of the gas station 10 further decreases the flow rate of hydrogen gas when the filling amount further approaches the target filling amount. The reason why the pressure value starts to slightly descend after time t4 is because hydrogen gas supply to the tank 22 stops at the end of filling and thereby a high gas temperature falls inside the tank 22, resulting in decrease in the pressure in the filling passage 23 detected by the pressure sensor 42. After time t5, the pressure value stabilizes and becomes constant.

As described above, the control unit 28 of the vehicle 20 can determine, based on the pressure change rate calculated from the detection value of the pressure sensor 42 mounted on the vehicle 20, whether or not the filling ends soon, and can start heating of the receptacle 25 with the heater 48. Accordingly, it becomes possible to suppress decrease in the filling amount and increase in power consumption caused by the heating start time being too soon. It also becomes possible to suppress freezing of the nozzle 13 and the receptacle 25 at the end of filling caused by the heating start time being too late.

For example, when the pressure value becomes equal to or above a specified threshold, the control unit 28 may determine that the filling ends soon because the actual filling amount in the tank 22 is sufficient. Based on the determination, the control unit 28 may start heating of the receptacle 25. However in that case, when the amount of hydrogen gas filled into the tank 22 is, for example, smaller than the maximum filling capacity of the tank 22, the pressure value may not become equal to or above the threshold even after the end of filling of the tank 22, which may cause failure in heating the receptacle 25. When the tank 22 is filled with a certain amount of hydrogen gas at the start of filling, the pressure value may already reach the threshold or more at the start of filling, or the pressure value may reach the threshold or more immediately after the start of filling. In that case, heating may start too soon to provide a desired filling amount. Furthermore, the power consumption caused by heating may also increase. When the pressure value may fluctuate during filling operation due to the influence of ambient temperature or due to the influence of the temperature of hydrogen gas filled by the dispenser 11, the pressure value may become equal to or above the threshold too soon. In that case, the power consumption may also increase due to failure in providing a desired filling amount. In the present embodiment, heating of the receptacle 25 can be started at the time adequate to suppress the possibility of such occurrence because heating start time is determined not just based on the pressure value but based on the pressure change rate.

When heating starts too soon in the case where the resinous liner 61 is used as in the case of the tank 22 of the present embodiment, the temperature inside the tank 22 increases due to the hydrogen gas heated through the receptacle 25, which may influence the resinous liner 61. When the temperature inside the tank 22 detected by the temperature sensor 41 becomes too high, filling may be stopped to suppress the influence exerted upon the quality of the resinous liner 61. Specifically, when the temperature inside the tank 22 becomes equal to or above a specified temperature during filling operation, the control unit 28 of the vehicle 20 transmits the information to the control unit 16 of the gas station 10. The control unit 16 closes the solenoid valve provided in the connection point between the dispenser 11 and the filling hose 12 to stop filling. The filling amount may also decrease due to the filling operation being stopped. In the present embodiment, the possibility of such occurrence may also be suppressed by setting adequate heating start time.

In the present embodiment, the control unit 28 of the vehicle 20 can suppress freezing of the receptacle 25 and the nozzle 13, while suppressing decrease in the filling amount of hydrogen gas and increase in power consumption not based on the information sending to the control unit 16 of the gas station 10 but with use of the pressure sensor 42 and the heater 48 mounted on the vehicle 20. This makes it possible to suppress increase in the amount of information sending from the control unit 28 of the vehicle 20 to the control unit 16 of the gas station 10, and to suppress increase in processing load of the control unit 16 of the gas station 10.

As described in the foregoing, since the heater 48 is provided in the vehicle 20 side, heating can adequately be started in the vehicle 20 immediately before the end of filling even in the case where the gas station 10 side does not include such a heater. When information is not transmitted from the gas station 10 to the vehicle 20 side, the vehicle 20 side is unable to acquire information such as the target hydrogen filling amount and the target hydrogen filling pressure set in the gas station 10. Accordingly, it is difficult for the vehicle 20 side to grasp that the filling ends soon. However, according to the embodiment, it is possible to accurately determine that the filling ends soon, and to start heating based on the determination.

In the embodiment, heating of the receptacle 25 is started after the lapse of specified time tq from decrease in the pressure change rate. However, heating of the receptacle 25 may be started immediately after decrease in the pressure change rate without setting the specified time. In that case, at the moment when the pressure change rate decreases, it is determined that filling ends soon.

A description is now given of heating control in modifications. In the heating control in the modifications described below, the processing steps similar to those in the embodiment are designated by similar reference signs to omit redundant description. First, a first modification will be described. In the first modification, unlike the embodiment, adequate start time of heating the receptacle 25 is determined with use of a temperature change rate inside the tank 22 as one example of a parameter value correlated with the filling speed of hydrogen gas filled into the tank 22 from the gas station 10. This is because the pressure change rate inside the tank 22 changes in accordance with change in the filling speed from the gas station 10 to the tank 22. With the change in the filling speed, the temperature change rate inside the tank 22 also changes.

Figure 5:
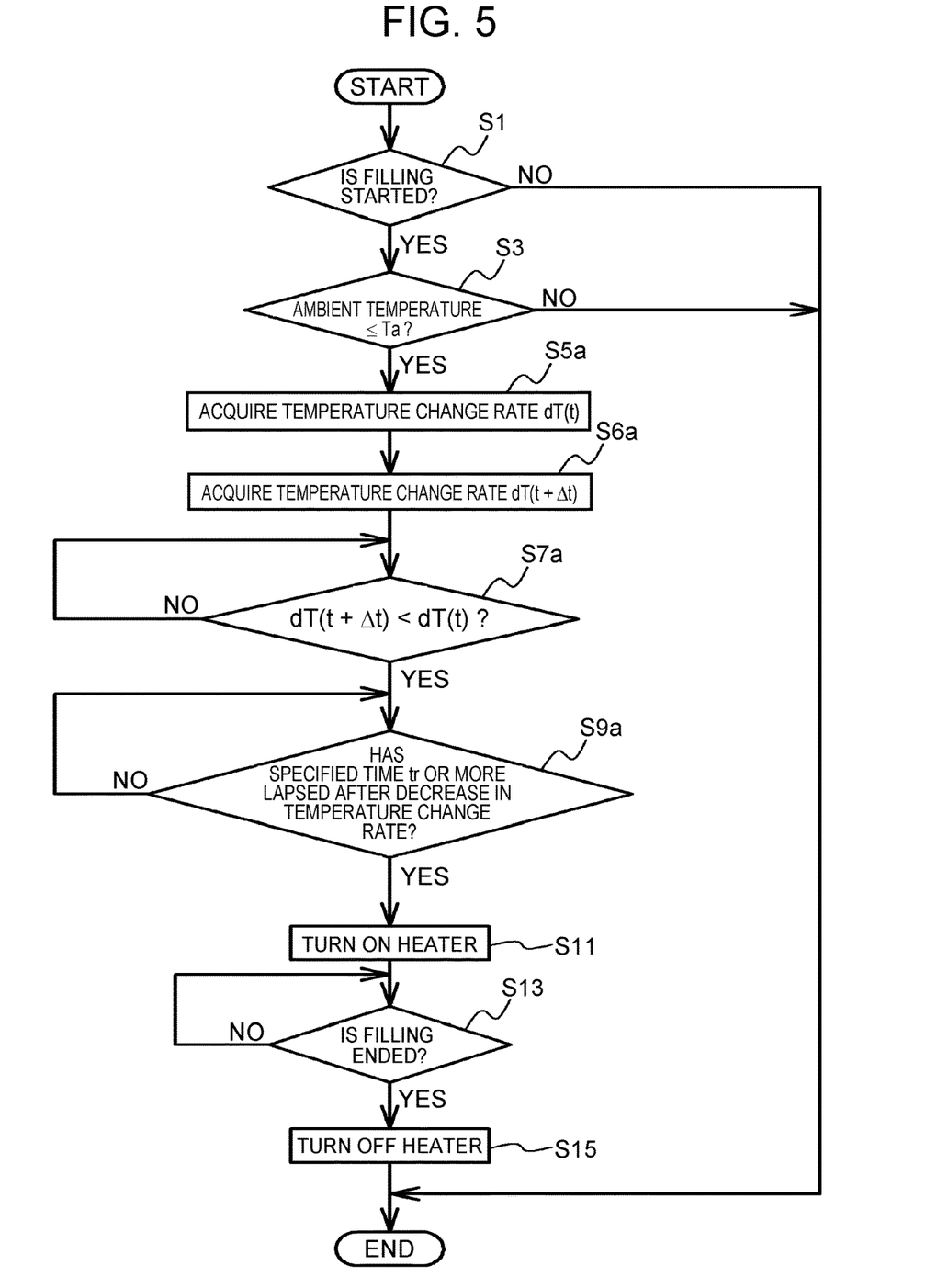
FIG. 5 is a flowchart illustrating one example of heating control in a first modification.

FIG. 5 is a flowchart illustrating one example of the heating control in the first modification. When positive determination is made in step S3, the control unit 28 acquires a temperature change rate dT(t) at time t based on the detection value of the temperature sensor 41 (step S5a). As described in the embodiment, the pressure change rate dP(t) first rises to a specified value at the start of filling, and the specified value is maintained in the middle stage. Accordingly, the temperature change rate dT(t) similarly rises to a specified value at the start of filling, and the value is maintained in the middle stage. The change rate of temperature is calculated by differentiating a temperature calculated based on the detection value of the temperature sensor 41 by time.

Next, the control unit 28 acquires a temperature change rate dT(t+Δt) after the lapse of Δt from time t (step S6a). The control unit 28 compares the temperature change rate dT(t+Δt) with the temperature change rate dT(t) at time t to determine whether or not dT(t+Δt) becomes smaller than dT(t) (step S7a). Here, as described in the foregoing, the control unit 16 of the gas station 10 performs control such that the flow rate of hydrogen gas from the dispenser 11 to the tank 22 decreases as the actual filling amount of the tank 22, from the start of filling, approaches the target filling amount. Accordingly, the change rate of pressure inside the tank 22 also decreases, and with the decrease, the temperature change rate inside the tank 22 also decreases. Therefore, the control unit 28 of the vehicle 20 can determine that the end of filling is approaching, when the temperature change rate in the tank 22, calculated based on the detection value of the temperature sensor 41, decreases. Processing of step S7a is one example of processing executed by the determination unit that determines whether or not the temperature change rate inside the tank 22, correlated with the filling speed of hydrogen gas filled into the tank 22 from the gas station 10, indicates decrease in filling speed during filling of hydrogen gas into the tank 22. When negative determination is made in step S7a, processing of step S7a is executed again.

When positive determination is made in step S7a, the control unit 28 determines whether or not specified time tr or more has lapsed after decrease in the temperature change rate (step S9a). The specified time tr is preset to be the time from decrease in the temperature change rate until before the end of filling. When negative determination is made, processing of step S9a is executed again. When positive determination is made in step S9a, processing of steps S11, S13, S15 is executed.

Figure 6:
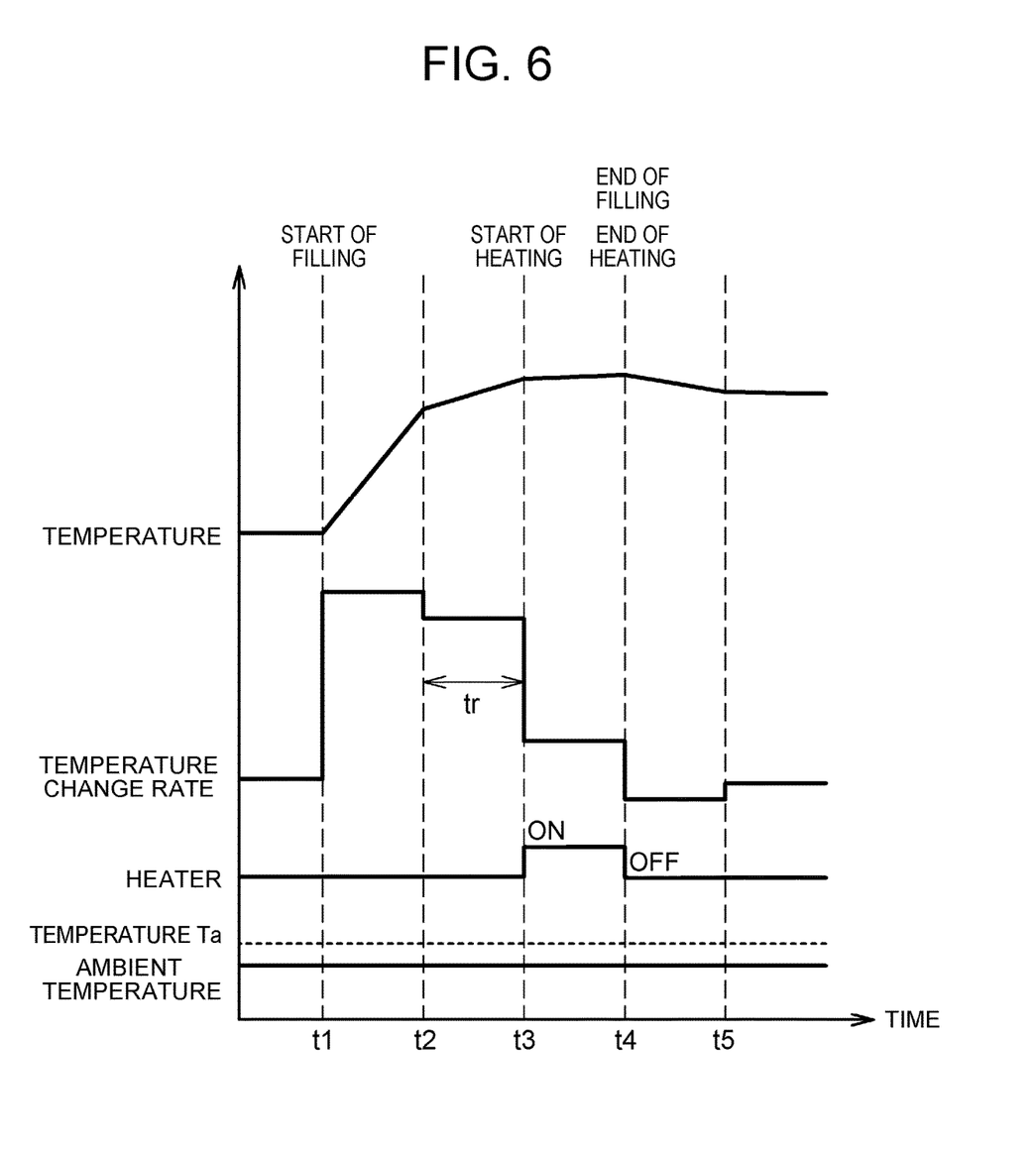
FIG. 6 is a timing chart illustrating one example of the heating control in the first modification.

FIG. 6 is a timing chart illustrating one example of the heating control in the first modification. FIG. 6 illustrates a temperature inside the tank 22 calculated based on the detection value of the temperature sensor 41, a temperature change rate calculated based on the temperature inside the tank 22, an energized state of the heater 48, and ambient temperature. When filling is started at time t1, the temperature rises with a steep gradient, while the temperature change rate is maintained at a relatively high value. At time t2, the control unit 16 of the gas station 10 determines that the end of filling is approaching. Based on the determination, the control unit 16 sets the flow rate of fuel gas filled into the tank 22 from the gas station 10 to be lower than before. Accordingly, at time t2, the temperature has a gradual climb gradient, so that the temperature change rate decreases. Thus, during a period from time t2 at which the temperature change rate decreases from a relatively high value to time t3 at which the specified period tr has lapsed, the heater 48 is switched from OFF to ON, and heating of the receptacle 25 is started. When filling is completed at time t4, the heater 48 is switched to OFF.

In the time chart illustrated in FIG. 6, the temperature also has a still more gradual climb gradient at time t3 than before, starts to slightly drop after time t4, and stabilizes after t5 because of the same reason as in FIG. 4.

As described above, in the first modification, the control unit 28 of the vehicle 20 can determine, based on the temperature change rate calculated from the detection value of the temperature sensor 41 mounted on the vehicle 20, whether or not the filling ends soon, and can start heating of the receptacle 25 with the heater 48. Accordingly, it becomes possible to suppress freezing of the nozzle 13 and the receptacle 25 at the end of filling, while suppressing decrease in the filling amount and increase in power consumption.

Figure 7:
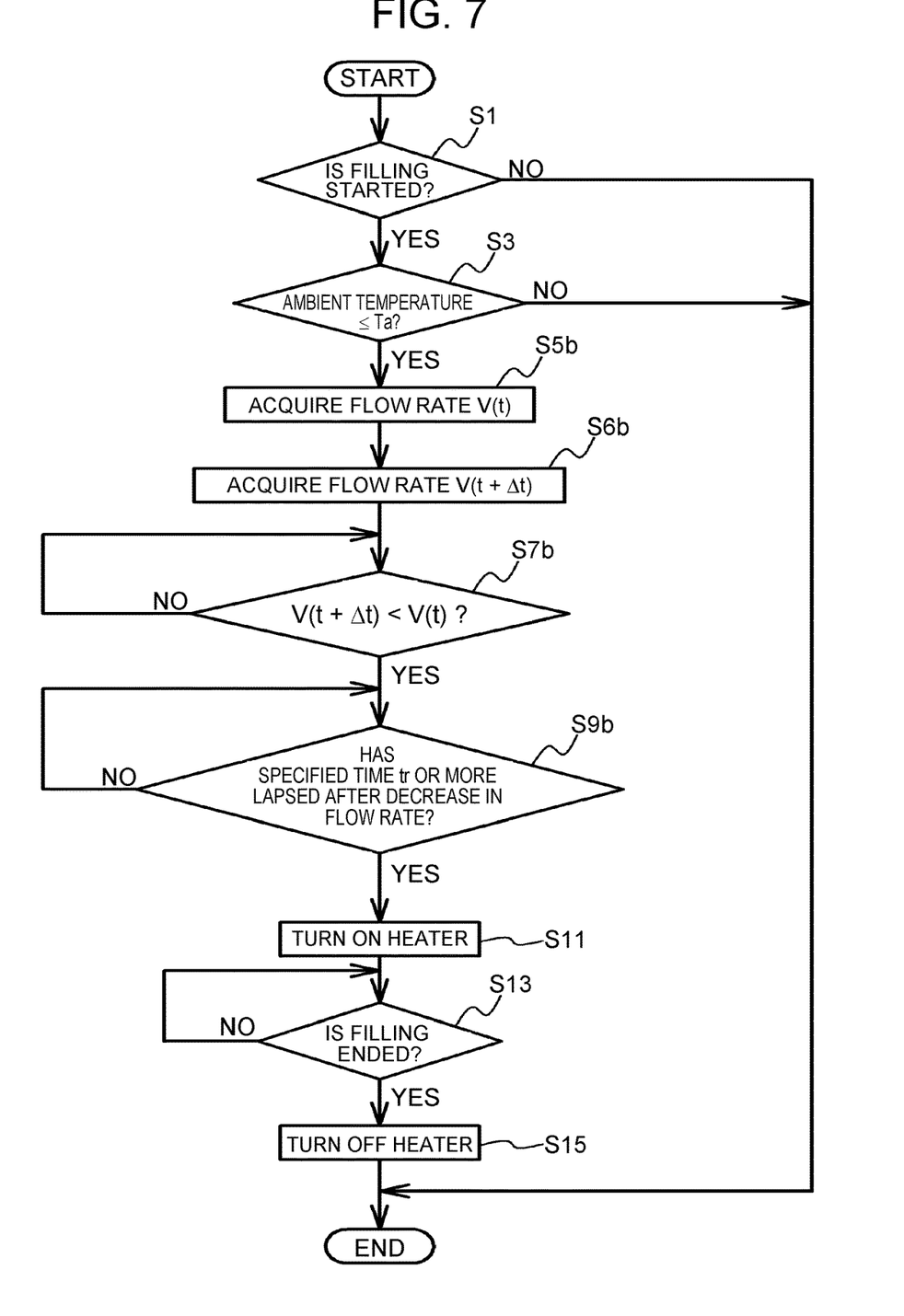
FIG. 7 is a flowchart illustrating one example of heating control in a second modification.

Now, the heating control in the second modification will be described. In the second modification, unlike the embodiment, adequate start time of heating the receptacle 25 is determined with use of a flow rate of hydrogen gas passing through the filling passage 23 as one example of a parameter value correlated with the filling speed of hydrogen gas filled into the tank 22 from the gas station 10. This is because the flow rate of hydrogen gas changes in accordance with change in the filling speed from the gas station 10 to the tank 22. FIG. 7 is a flowchart illustrating one example of the heating control in the second modification. When positive determination is made in step S3, the control unit 28 acquires a flow rate V(t) at time t based on the detection value of the flow sensor 43 (step S5b).

Next, the control unit 28 acquires a flow rate V(t+Δt) after the lapse of Δt from time t (step S6b). The control unit 28 compares the flow rate V(t+Δt) with the flow rate V(t) at time t to determine whether or not V(t+Δt) becomes smaller than V(t) (step S7b). As described in the foregoing, the control unit 16 of the gas station 10 is controlled such that as the actual filling amount of the tank 22, from the start of filling, approaches the target filling amount, the flow rate of hydrogen gas from the dispenser 11 to the tank 22 decreases. As a consequence, the flow rate of hydrogen gas passing through the filling passage 23 also decreases. Therefore, the control unit 28 of the vehicle 20 can determine that the end of filling is approaching, when the flow rate, calculated based on the detection value of the flow sensor 43, decreases. Processing of step S7b is one example of processing executed by the determination unit that determines whether or not the flow rate of hydrogen gas flowing into the tank 22, correlated with the filling speed of hydrogen gas filled into the tank 22 from the gas station 10, indicates decrease in filling speed during filling of hydrogen gas into the tank 22. When negative determination is made in step S7b, processing of step S7b is executed again.

When positive determination is made in step S7b, the control unit 28 determines whether or not specified time ts or more has lapsed after decrease in the flow rate (step S9b). The specified time ts is preset to be the time from decrease in the flow rate until before the end of filling. When negative determination is made, processing of step S9b is executed again. When positive determination is made in step S9b, processing of steps S11, S13, S15 is executed.

Figure 8:
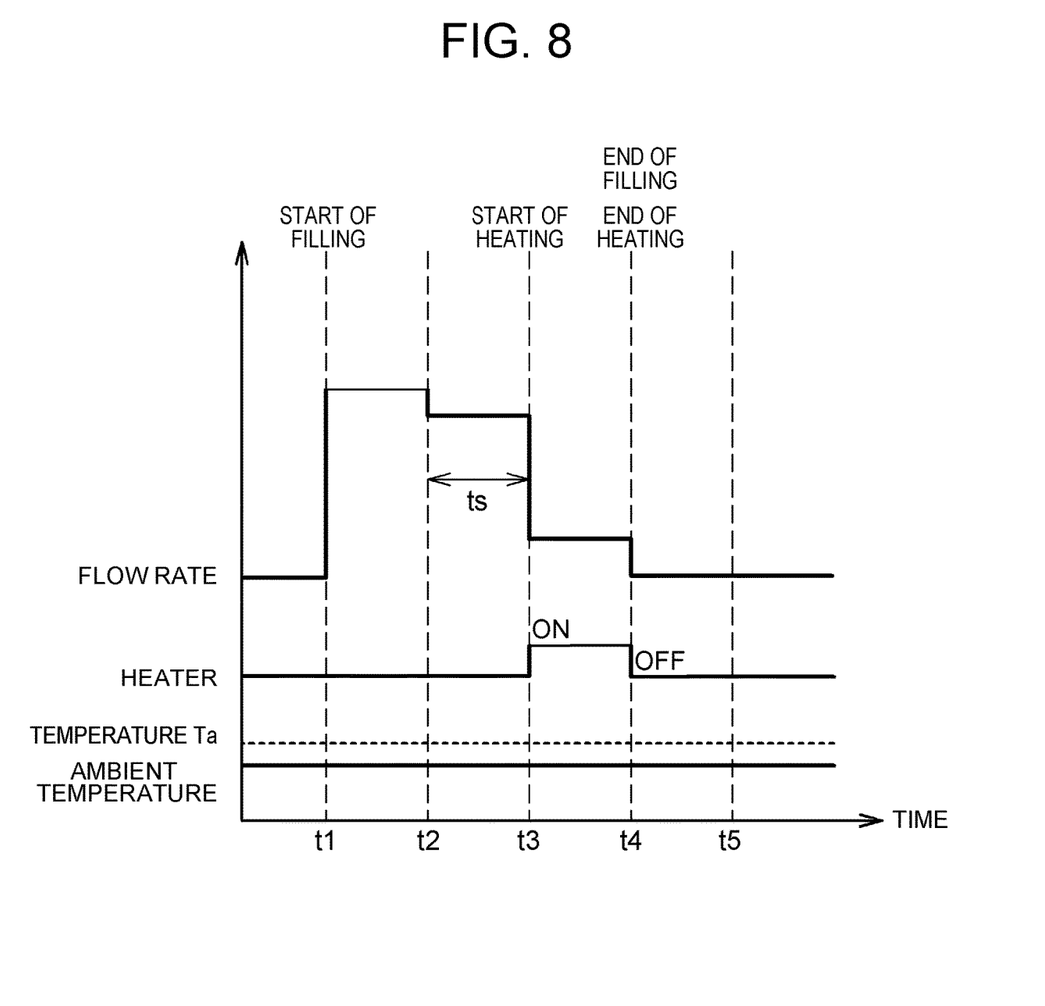
FIG. 8 is a timing chart illustrating one example of the heating control in the second modification.

FIG. 8 is a timing chart illustrating one example of the heating control in the second modification. FIG. 8 illustrates a flow rate that is the detection value of the flow sensor 43, an energized state of the heater 48, and ambient temperature. When filling is started at time t1, the flow rate is maintained at a relatively high value. At time t2, the control unit 16 of the gas station 10 determines that the end of filling is approaching. Based on the determination, the control unit 16 sets the flow rate of fuel gas filled into the tank 22 from the gas station 10 to be lower than before. Accordingly, the flow rate decreases at time t2. During a period from time t2 at which the flow rate decreases from a relatively high value to time t3 at which the specified period ts has lapsed, the heater 48 is switched from OFF to ON, and heating of the receptacle 25 is started. When filling is completed at time t4, the heater 48 is switched to OFF.

Also in the time chart illustrated in FIG. 8, the flow rate decreases more than before at time t3 for the same reason as in FIG. 4. Since the filling is ended after time t4, the flow rate of hydrogen gas in the filling passage 23 is zero.

As described above, in the second modification, the control unit 28 of the vehicle 20 can determine, based on the flow rate of hydrogen gas that is the detection value of the flow sensor 43 mounted on the vehicle 20, whether or not the filling ends soon, and can start heating of the receptacle 25 with the heater 48. Accordingly, it becomes possible to suppress freezing of the nozzle 13 and the receptacle 25 at the end of filling, while suppressing decrease in the filling amount and increase in power consumption.

Figure 9:
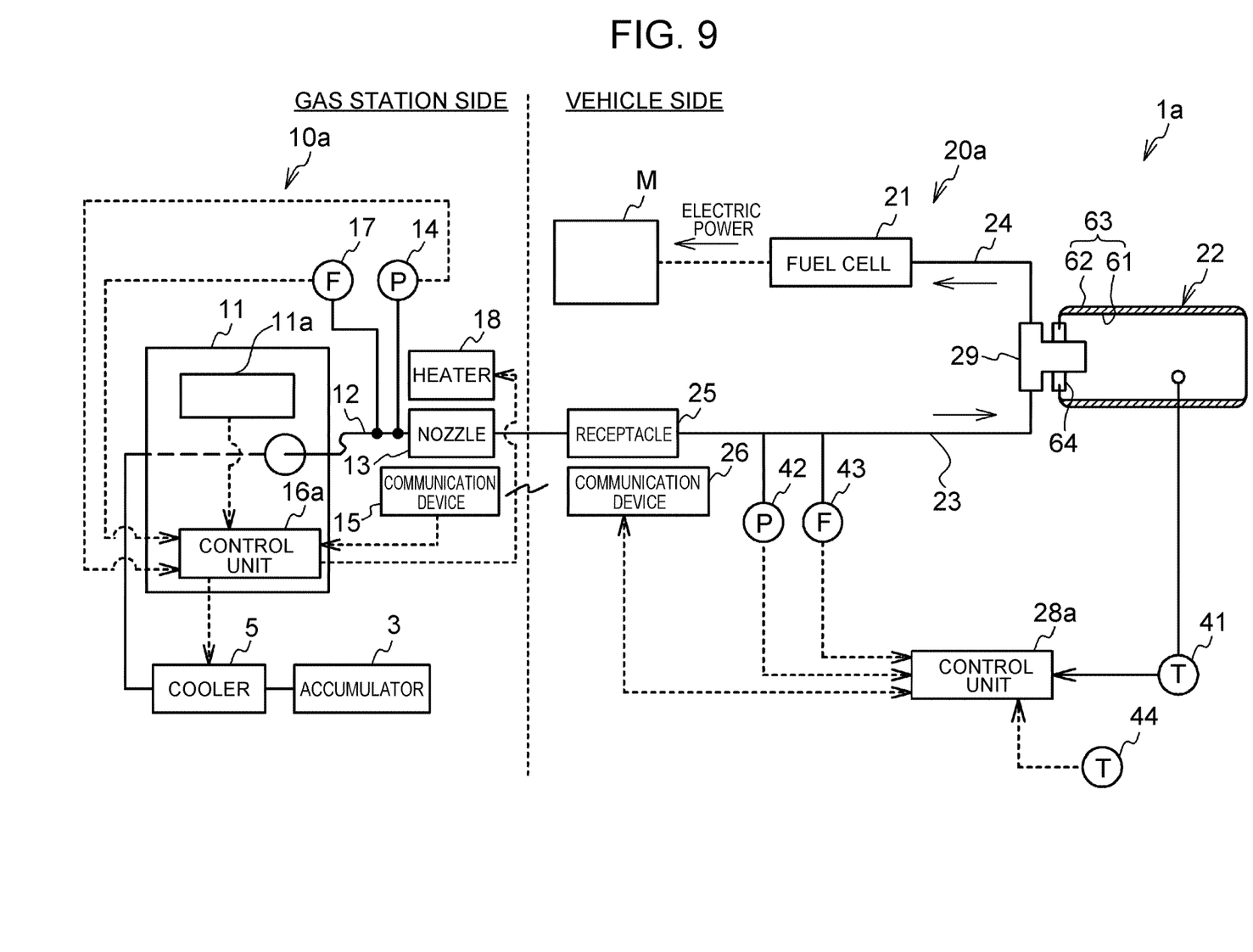
FIG. 9 is an explanatory view of a gas station and a vehicle in a modification.

A description is now given of a gas filling system 1a, a gas station 10a and a vehicle 20a of a modification. FIG. 9 is an explanatory view of the gas filling system 1, the gas station 10a and the vehicle 20a in the modification. In the present modification, unlike the gas station 10 and the vehicle 20 illustrated in FIG. 2, the vehicle 20a is not provided with the heater 48. Instead, the gas station 10a side is provided with a heater 18 that heats the nozzle 13. In such a configuration, when the filling speed decreases, a control unit 16a starts heating of the nozzle 13 with the heater 18. In this case, decrease in the filling speed can be determined based on the detection value of the pressure sensor 14 or the detection value of the flow sensor 17. This is because the decrease in the filling speed is determined based on the detection value of the pressure sensor 14 and the detection value of the flow sensor 17, like the detection value of the pressure sensor 42 and the detection value of the flow sensor 43 of the vehicle 20a side. A control unit 28a of the vehicle 20a may transmit a detection value of the temperature sensor 41 that detects the temperature of the tank 22 to the control unit 16a of the gas station 10a side through the communication devices 26, 15. The control unit 16a may determine decrease in the filling speed based on the acquired detection value of the temperature sensor 41.

Although the embodiment of the present disclosure has been described in detail, the present disclosure is not limited to such a specific embodiment. Various modifications and changes may be possible within the scope of the gist of the present disclosure disclosed in the claims.

In the embodiment and the modifications, the tank 22 including the resinous liner 61 has been described as an example. However, the tank is not limited to the tank 22, and any tank may be used as long as fuel gas can be filled therein.

In the embodiment and the modifications, the fuel cell vehicle mounted with the fuel cell 21 has been described as an example of the vehicle. However the vehicle to which the present disclosure is applicable is not limited to the fuel cell vehicle. For example, the vehicle may be a vehicle mounted with an internal combustion engine capable of burning hydrogen gas or cooling fuel gas. In that case, examples of the fuel gas filled into the tank include hydrogen gas, as well as liquefied petroleum gas, liquefied natural gas, and compressed natural gas. The fuel gases are each cooled to below the freezing point, and are then filled into the tank.

In FIGS. 4, 6, and 8, the pressure value, the pressure change rate, the temperature inside the tank 22, the temperature change rate, and the flow rate show a linear change. However, without being limited to the above case, the parameters may show a curved change.

What is claimed is:
1. A vehicle, comprising:
   a tank configured to be filled with fuel gas;
   a receptacle configured to be connected to a nozzle included in a fuel gas filling apparatus, the fuel gas filling apparatus being configured to cool the fuel gas, fill the fuel gas into the tank, decrease a filling speed of the fuel gas filled into the tank before a filling amount of the fuel gas filled into the tank reaches a target filling amount, and then end filling of the fuel gas into the tank;
   a filling passage configured to provide communication between the receptacle and the tank;
   a heating unit configured to heat the receptacle;
   a determination unit configured to determine whether or not a parameter value, correlated with the filling speed of the fuel gas filled into the tank from the fuel gas filling apparatus, indicates decrease in the filling speed during filling of the fuel gas into the tank based on whether or not the parameter value becomes smaller after a predetermined time has passed; and
   a control unit configured to, when the determination unit determines that the parameter value indicates decrease in the filling speed during filling of the fuel gas into the tank, cause the heating unit to start heating of the receptacle during filling of the fuel gas into the tank,
   wherein the parameter value is any one of a change rate of pressure inside the tank and a change rate of temperature inside the tank.
2. The vehicle according to claim 1, wherein the tank has a resinous liner.

3. The vehicle according to claim 1, further comprising an ambient temperature sensor configured to detect ambient temperature, wherein
the control unit is configured to, when the detected ambient temperature is equal to or below a specified temperature and when the determination unit determines that the parameter value indicates decrease in the filling speed during filling of the fuel gas into the tank, cause the heating unit to start heating of the receptacle during filling of the fuel gas into the tank.

4. The vehicle according to claim 1, further comprising a fuel cell configured to generate electric power upon reception of the fuel gas filled in the tank.

5. A method for filling fuel gas, including filling a tank with cooled fuel gas from a fuel gas filling apparatus through a connecting portion configured to detachably connect the tank and the fuel gas filling apparatus, decreasing a filling speed of filling the fuel gas into the tank before a filling amount of the fuel gas filled into the tank reaches a target filling amount, and then ending filling of the fuel gas into the tank, the method comprising:

determining whether or not a parameter value, correlated with the filling speed of the fuel gas filled into the tank from the fuel gas filling apparatus, indicates decrease in the filling speed during filling of the fuel gas into the tank based on whether or not the parameter value becomes smaller after a predetermined time has passed; and starting heating of the connecting portion during filling of the fuel gas into the tank, when determining that the parameter value indicates decrease in the filling speed during filling of the fuel gas into the tank, wherein the parameter value is any one of a change rate of pressure inside the tank and a change rate of temperature inside the tank.

* * * * *